(12) United States Patent
Provenzano

(10) Patent No.: US 10,935,399 B1
(45) Date of Patent: Mar. 2, 2021

(54) PASSIVE RANDOM DEPOLARIZER FOR A TUNABLE LASER

(71) Applicant: Dan Raymond Provenzano, Blacksburg, VA (US)

(72) Inventor: Dan Raymond Provenzano, Blacksburg, VA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/661,403

(22) Filed: Oct. 23, 2019

(51) Int. Cl.
*G01D 5/353* (2006.01)
*G01M 11/02* (2006.01)
*G02B 6/27* (2006.01)
*G02B 6/42* (2006.01)
*G01V 8/16* (2006.01)
(Continued)

(52) U.S. Cl.
CPC ....... *G01D 5/35358* (2013.01); *E21B 47/007* (2020.05); *E21B 47/06* (2013.01); *E21B 47/07* (2020.05); *G01L 1/242* (2013.01); *G01M 11/0207* (2013.01); *G01M 11/085* (2013.01); *G01V 8/16* (2013.01); *G02B 6/2786* (2013.01); *G02B 6/4213* (2013.01); *G02B 6/4216* (2013.01); *E21B 47/135* (2020.05)

(58) Field of Classification Search
CPC ........ E21B 47/007; E21B 47/07; E21B 47/06; E21B 47/13; E21B 47/135; G02B 6/2786; G02B 6/4213; G02B 6/4216; G01M 11/0207; G01M 11/08; G01M 11/083; G01M 11/085; G01M 11/086; G01M 11/30; G01M 11/31; G01M 11/3109; G01M 11/3127; G01M 11/3145; G01M 11/3154; G01M 11/3172; G01M 11/3181; G01M 11/319; G01D 5/268; G01D 5/353; G01D 5/35338; G01D 5/35341; G01D 5/35345; G01D 5/35351; G01D 5/35354; G01D 5/35358; G01D 5/35361; G01D 5/35364; G01D 5/35367; G01L 1/24; G01L 1/241; G01L 1/242
USPC .............................. 356/32, 73.1; 385/12, 13
See application file for complete search history.

(56) References Cited

U.S. PATENT DOCUMENTS 4,572,608 A * 2/1986 Mochizuki ............... G02B 6/10
359/489.08
4,923,290 A 5/1990 Brinkmeyer et al.
(Continued)

FOREIGN PATENT DOCUMENTS

WO 2013128446 A1 9/2013

*Primary Examiner* — Gordon J Stock, Jr.
(74) *Attorney, Agent, or Firm* — Cantor Colburn LLP

(57) ABSTRACT

An apparatus for sensing a value of a property includes: an optical sensor having a single mode optical fiber responsive to the property; an optical interrogator having a tunable laser to transmit polarized light to the optical sensor, a photodetector to receive sensor light, and a controller configured to process the received light and output the value of the property; and a passive random depolarizer disposed between the tunable laser and the single mode optical fiber and having (i) a first polarization maintaining (PM) optical fiber of length L1 having a first fast optical axis and a first slow optical axis and (ii) a second PM optical fiber of length L2 having a second fast optical axis and a second slow optical axis rotationally spliced to the first PM optical fiber in which the second fast and slow optical axes are offset from the first fast and slow optical axes.

13 Claims, 7 Drawing Sheets

(51) Int. Cl.
*E21B 47/06* (2012.01)
*E21B 47/07* (2012.01)
*E21B 47/007* (2012.01)
*G01M 11/08* (2006.01)
*G01L 1/24* (2006.01)
*E21B 47/135* (2012.01)

(56) References Cited

U.S. PATENT DOCUMENTS

| | | | | |
|---|---|---|---|---|
| 5,118,931 A * | 6/1992 | Udd | ................ | G01D 5/35383 |
| | | | | 250/227.16 |
| 5,457,756 A * | 10/1995 | Hartl | ................ | G01C 19/721 |
| | | | | 385/11 |
| 6,195,162 B1 * | 2/2001 | Varnham | ................ | G01H 9/004 |
| | | | | 250/227.19 |
| 6,363,180 B1 * | 3/2002 | Yamate | ................ | G01D 5/344 |
| | | | | 356/35.5 |
| 6,735,350 B1 * | 5/2004 | Gauthier | ................ | G02B 6/2713 |
| | | | | 359/334 |
| 7,027,198 B2 | 4/2006 | Yao | | |
| 7,127,132 B1 * | 10/2006 | Moslehi | ................ | G01D 5/35303 |
| | | | | 385/12 |
| 7,333,680 B2 * | 2/2008 | Yong | ................ | G01D 5/35303 |
| | | | | 250/205 |
| 7,703,514 B2 * | 4/2010 | Chee | ................ | E21B 47/10 |
| | | | | 166/250.01 |
| 8,233,754 B2 * | 7/2012 | Bohnert | ................ | G01R 15/242 |
| | | | | 385/12 |
| 8,699,009 B2 * | 4/2014 | Li | ................ | G01B 11/18 |
| | | | | 356/33 |
| 9,385,504 B2 | 7/2016 | McClean et al. | | |
| 9,541,399 B2 * | 1/2017 | Tazartes | ................ | G01C 25/00 |
| 2004/0021942 A1 | 2/2004 | Yamamoto et al. | | |
| 2005/0046860 A1 * | 3/2005 | Waagaard | ................ | G01D 5/35303 |
| | | | | 356/478 |
| 2014/0100462 A1 * | 4/2014 | Rourke | ................ | A61B 5/0095 |
| | | | | 600/462 |
| 2020/0271863 A1 * | 8/2020 | Rose | ................ | G02B 6/2786 |

* cited by examiner

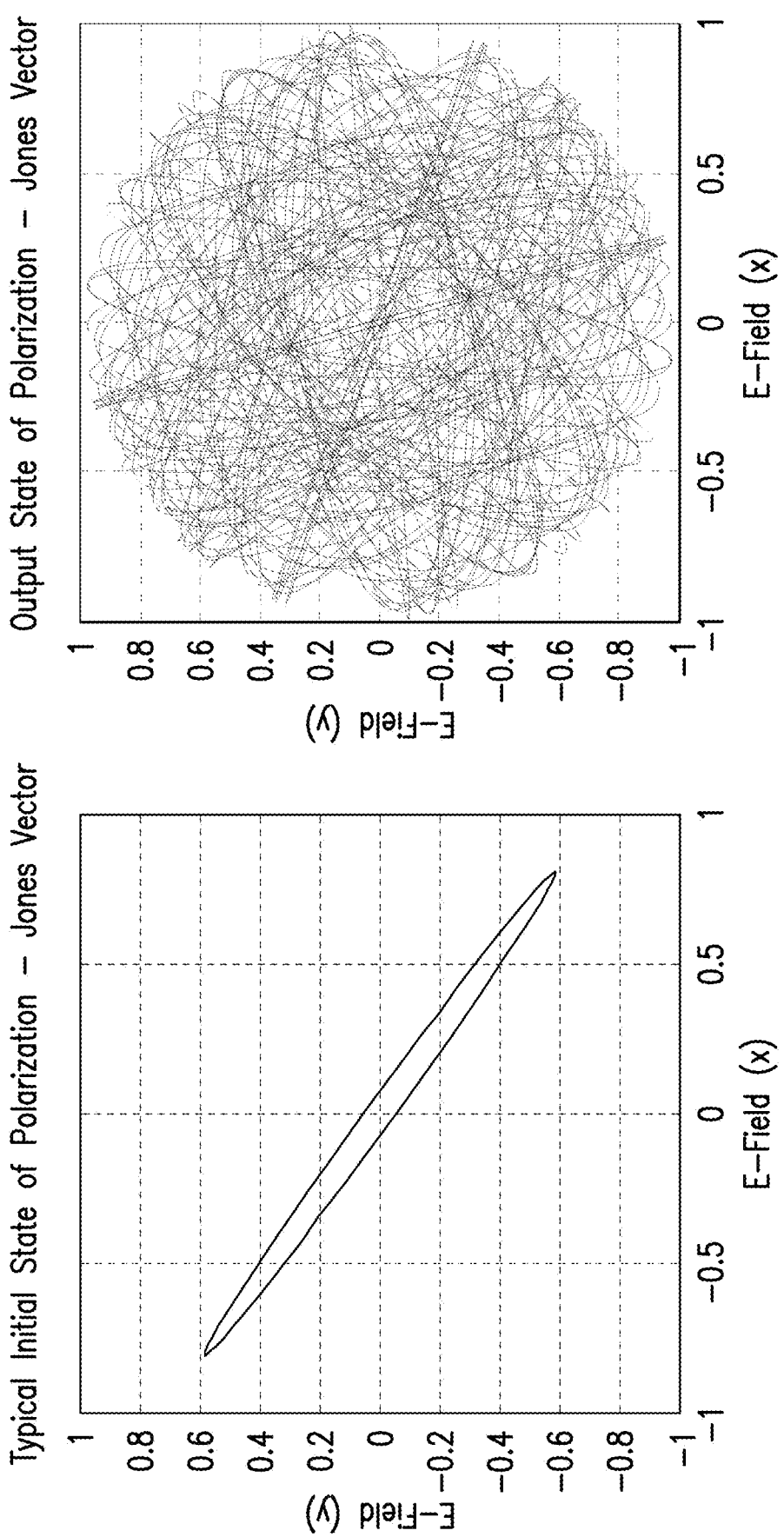

PASSIVE RANDOM DEPOLARIZER FOR A TUNABLE LASER

BACKGROUND

Boreholes are drilled into earth formations for various purposes such as hydrocarbon production, geothermal production, and carbon dioxide sequestration. A sensor for measuring pressure and temperature may be disposed in a borehole such as between a tubular and a casing lining the borehole in order to provide data useful in a process or operation for utilizing the earth formation. The environment to which the sensor is exposed can be quite hazardous due to the high pressures and temperatures that may be experienced downhole. Typically, a sensor using an optical fiber may be used in this environment. Unfortunately, birefringence of the optical fiber can adversely affect an optical signal from the sensor resulting in inaccurate readings of the sensor. Hence, it would be well received in industries making use of the earth formations if sensors for measuring one or more properties downhole were developed to withstand the downhole environment and still provide accurate measurements.

BRIEF SUMMARY

Disclosed is an apparatus for sensing a value of a property. The apparatus includes: an optical sensor having a single mode optical fiber and having an optical characteristic that is altered according to the value of the property in order to sense the value of the property and provide an optical signal that represents the value of the property; an optical interrogator having a tunable laser configured to transmit polarized light at selected wavelengths to the optical sensor, a photo-detector configured to receive the optical signal due to the transmitted light, and a controller configured to process the optical signal in order to output the value of the property; and a passive random depolarizer disposed between the tunable laser and the single mode optical fiber and including (i) a first polarization maintaining (PM) optical fiber of length L1 having a first fast optical axis and a first slow optical axis and (ii) a second PM optical fiber of length L2 having a second fast optical axis and a second slow optical axis spliced to the first PM optical fiber by a first rotational splice in which the second fast optical axis and the second slow optical axis are offset from the first fast optical axis and the first slow optical axis, the second PM optical fiber being in optical communication with the single mode optical fiber.

Also disclosed is a method for sensing a value of a property, the method includes: transmitting polarized light at a plurality of selected wavelengths using a tunable laser into a passive random depolarizer to provide randomly polarized light at the plurality of wavelengths, the passive random depolarizer includes (i) a first polarization maintaining (PM) optical fiber of length L1 having a first fast optical axis and a first slow optical axis and (ii) a second PM optical fiber of length L2 having a second fast optical axis and a second slow optical axis spliced to the first PM optical fiber by a rotational splice in which the second fast optical axis and the second slow optical axis are offset from the first fast optical axis and the first slow optical axis; transmitting the randomly polarized light at the plurality of wavelengths from the passive random depolarizer to an optical sensor having an optical characteristic that is altered according to the value of the property in order to sense the value of the property and provide an optical signal that represents the value of the property, wherein the optical sensor comprises a single mode optical fiber; receiving the optical signal with a photo-detector due to the transmitted randomly polarized light at the plurality of wavelengths; and processing the optical signal using a controller in order to output the value of the property; wherein an optical interrogator comprises the tunable laser, the photo-detector, and the controller.

BRIEF DESCRIPTION OF THE DRAWINGS

The following descriptions should not be considered limiting in any way. With reference to the accompanying drawings, like elements are numbered alike:

FIGS. 4A-4C, collectively referred to as FIG. 4, depict aspects of an optical signal output from the pseudo-random depolarizer due to sweeping a wavelength of light input to the pseudo-random depolarizer;

DETAILED DESCRIPTION

A detailed description of one or more embodiments of the disclosed apparatus and method presented herein by way of exemplification and not limitation with reference to the figures.

Disclosed are embodiments of apparatuses and methods for sensing a property in a borehole penetrating the earth. The apparatuses and methods involve using an optical fiber sensor made of glass in order to withstand a harsh downhole environment having high pressures, which can be thousands of pounds per square inch (psi) and high temperatures, which can exceed 200° C. The optical fiber sensor is read or interrogated by an optical interrogator that includes a tunable laser that is configured emit light with a wavelength that is swept and receive a reflected signal. Unfortunately, the optical fiber can have uncontrolled birefringence that can give variation or bias in the reflected signal based on the state of polarization of the light emitted by the tunable laser, which in general has a single polarization. In order to counteract the bias and resulting error, the swept wavelength light is then passed through a pseudo-random depolarizer that effectively depolarizes the light randomly. Because the light is randomly depolarized, any adverse birefringence effects such as bias are averaged out to provide a sensor reading that is not adversely affected by the uncontrolled birefringence of the optical fiber. In essence, all or most polarization states are generated as the tunable laser scans its range of wavelengths. Thus, each measurement scan is effectively averaged over all polarization states. Hence, a more accurate reading of the optical fiber sensor is obtained than if the uncontrolled birefringence effects were not averaged out.

The disclosure herein provides a way to effectively depolarize a tunable laser swept system. Each wavelength in the sweep is very much monochromatic and not depolarized. However, the collection of wavelengths provided by the disclosed system experienced by the optical fiber sensor after sweep has provided an effectively depolarized source of light.

Figure 1:
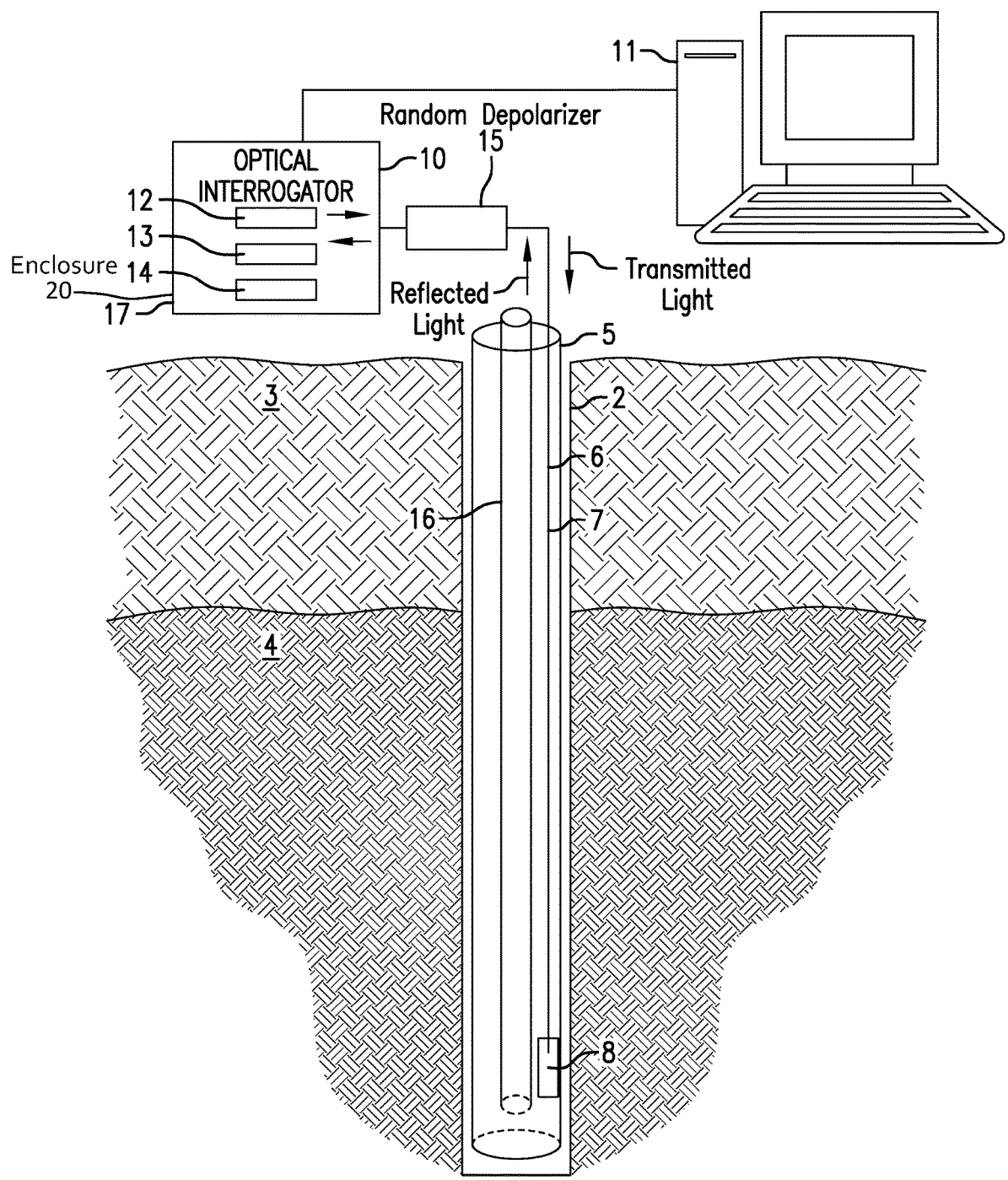
FIG. 1 is a cross-sectional view of an embodiment of a fiber optic sensor disposed in a borehole penetrating the earth.

FIG. 1 illustrates a cross-sectional view of a borehole 2 penetrating the earth 3 having a formation 4, which represents a subsurface material. The borehole 2 is lined with a casing 5 that may be cemented in place. An optical fiber sensor 6 is disposed on a production tubular 16 disposed in the casing 5. The production tubular 16 represents any downhole structure to which the optical fiber sensor 6 may be attached for sensing a parameter of interest. The optical fiber sensor 6 includes a single mode optical fiber 7 and is configured to sense a value of a property downhole such as pressure, temperature, or strain in non-limiting embodiments. In one or more embodiments, the optical fiber sensor 6 uses a natural scattering property of the optical fiber 7, due to small residual birefringence for example, to measure the value of the property at various locations along the optic fiber 7. Alternatively, or in addition, an optical gauge 8, which includes a single mode optical fiber with small residual birefringence, is configured to sense the downhole property and may be disposed at the distal end of the optical fiber 7. In this case, the optical fiber 7 is used to transmit light to and receive reflected light from the optical gauge 8.

The optical fiber 7 is in optical communication with an optical interrogator 10. The optical interrogator 10 is configured to read (i.e., interpret) the natural backscattering of the fiber optic sensor 6 and/or the optical gauge 8 in order to determine the value of the property being sensed. Reading the value of the property being sensed includes varying a wavelength of transmitted light and measuring an intensity of light reflected by the sensor 8 as a function of wavelength to provide a response signal. The response signal may then be compared to a calibrated reference response signal to estimate the value of the property being sensed by the fiber optic sensor 6 and/or the optical gauge 8. The comparison between the response signal and the calibrated reference response signal may be performed by the optical interrogator 10 or, alternatively, the response signal may be transmitted to a computer processing system 11 for the comparison. In one or more embodiments, the optical interrogator 10 may include a tunable laser 12 for transmitting light at various wavelengths, either continuously or in steps, a photodetector 13 for measuring an intensity of reflected light, and a controller 14 for controlling operation of the optical interrogator 10. Non-limiting embodiments of operations controlled by the controller 14 may include tuning the laser 12 and processing received optical data to include recording the received optical data. In that optical interrogators are known in the art, they are not discussed in further detail herein.

A passive pseudo-random depolarizer 15 is optically coupled to an output of the tunable laser 12 in order to randomly depolarize light emitted by the tunable laser 12 as a function of wavelength. The term "passive" relates to the depolarizer 15 not having or requiring a source of power for operation. The term "pseudo" relates to the depolarizer 15 changing polarization of an input light signal as a function of wavelength in a manner that is effectively random, although extensive optical analysis might be able to predict the polarization as a function of wavelength. However, the polarization change is not linear or close to linear such that a percentage change in wavelength does not result in an equal percentage or close to equal percentage change in polarization. Consequently, a continuous sweep or step-wise changes in wavelength does not result in a continuous sweep or step-wise sweep in polarizations. For purposes of this disclosure, the change in polarization of output light as wavelength changes in the input light by the pseudo-random depolarizer 15 is considered to be random and the pseudo-random depolarizer 15 may thus be referred to as the random depolarizer 15.

Figure 2:
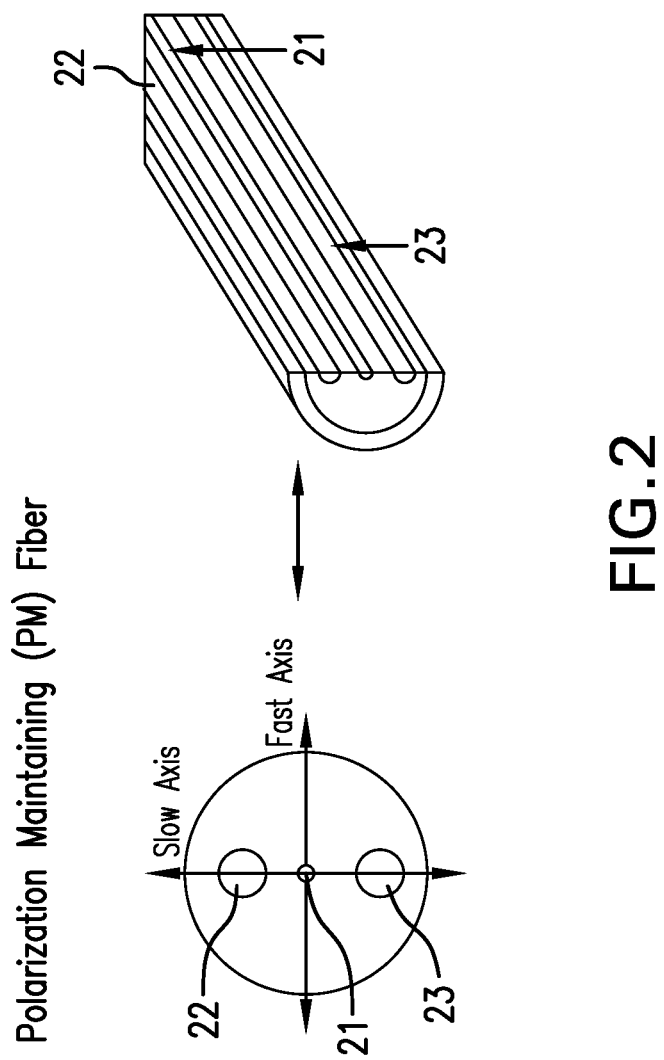
FIG. 2 depicts aspects of polarization maintaining optical fiber.

FIG. 2 depicts aspects of an embodiment of a polarization maintaining (PM) optical fiber 20 used in the random depolarizer 15. The PM optical fiber 20 is made of an optical fiber that is doped to provide a core 21, a first stress rod 22 and a second stress rod 23 as illustrated in FIG. 2. The core 21 is doped such that the core 21 has an index of refraction that is greater than the index of refraction of the surrounding cladding in order to maintain propagation of the optical signal along the optical fiber 20. In one or more embodiments, the core 21 is doped with Germanium. The first stress rod 22 and the second stress rod 23 are doped so as to permanently induce stress in the optical fiber 20 in order produce stress birefringence. By having the first stress rod 22 and the second stress rod 23, the optical fiber 20 has a fast axis and a slow axis as illustrated in FIG. 2 on the left side. The fast axis and the slow axis act to eliminate or minimize any cross talk between the two orthogonal polarization modes of light traveling through the optical fiber 20.

Figure 3:
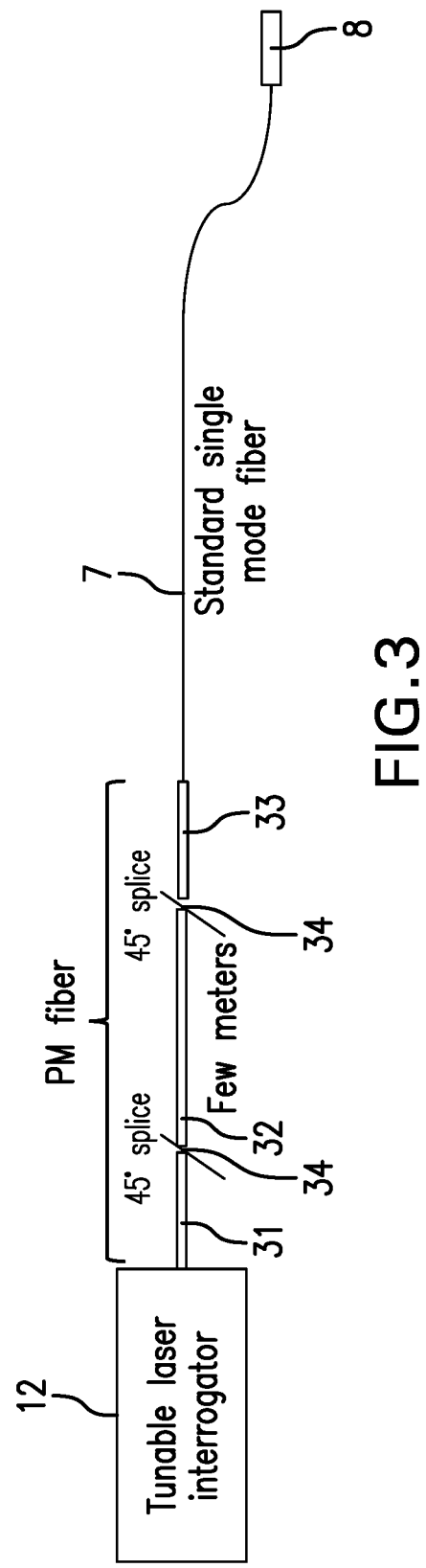
FIG. 3 depicts aspects of a pseudo-random depolarizer optically coupled to a tunable laser and an optical gauge.

FIG. 3 depicts aspects of the passive random depolarizer 15 disposed between the tunable laser 12 and the optical gauge 8. The passive random depolarizer 15 includes a first PM optical fiber 31 having a first fast optical axis and a first slow optical axis, a second optical fiber 32 having a second fast optical axis and a second slow optical axis, and a third optical fiber 33 having a third fast optical axis and a third slow optical axis. The first PM optical fiber 31 is spliced to the second PM optical fiber 32 by a first rotational splice 34. In the embodiment of FIG. 3, the first rotational splice 34 is such that the first fast and slow optical axes are rotationally offset from the second fast and slow optical axes, respectively, by 45° although other offset rotations may also be used. The second PM optical fiber 32 is also spliced to the third PM optical fiber by a second rotational splice 35. The second rotational splice 35 is similar to the first rotational splice 34 in that the second fast and slow optical axes are rotationally offset from the third fast and slow optical axes, respectively, also by 45° although other offset rotations may also be used. In one or more embodiments, the length L2 of the second PM optical fiber 32 is a few meters (e.g., greater than or equal to two meters) and is greater than the length L1 of the first PM optical fiber 31 and the length L3 of the third PM optical fiber 33. In one or more embodiments, the length of each PM optical fiber is at least one cm to help insure different polarizations in the sweep. Splicing devices for splicing optical fibers to include performing a rotational splice are commercially available. It can be appreciated that the passive random depolarizer 15 once constructed can be coiled and placed in an enclosure 20 housing the optical interrogator 10 (see FIG. 1) in order to protect the passive random depolarizer 15 and make transporting the depolarizer 15 more convenient.

In other embodiments, the random depolarizer 15 may include only the first PM optical fiber 31 spliced by the rotational splice 34 to the second PM optical fiber 32 where the other end of the second PM optical fiber 32 is in optical communication with the single mode optical fiber 7 to include the optical gauge 8 if used. In yet other embodiments, the random depolarizer 15 may include more than three PM optical fibers where each PM optical fiber is spliced to an adjoining PM optical fiber by a rotational splice.

Figure 4C:
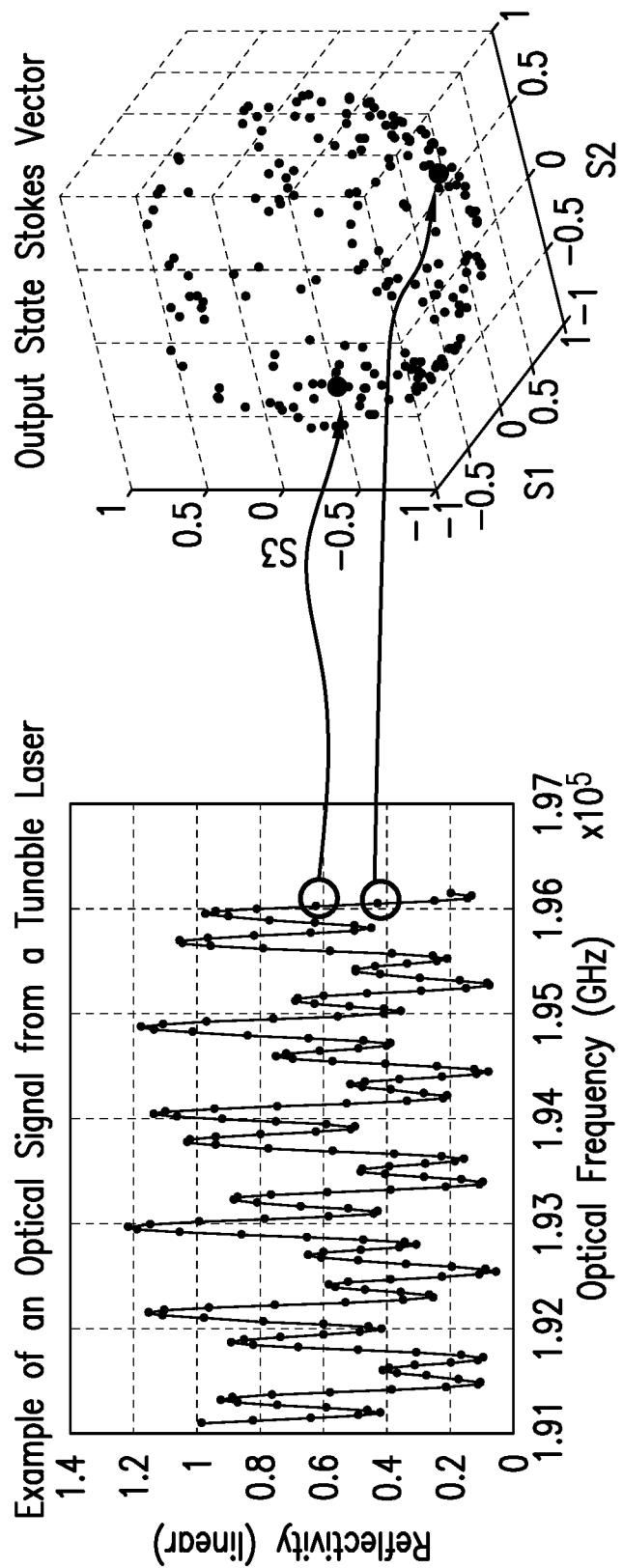

FIG. 4 depicts aspects of an optical signal output from the pseudo-random depolarizer 15 due to sweeping a wavelength of light input to the pseudo-random depolarizer 15. FIG. 4 illustrates one example of a Jones vector representation of a polarization state for polarized light emitted from the tunable laser 12 at one wavelength. In the Jones vector representation, the electric field vector for the emitted polarized light traces out the path of an oval during each frequency oscillation. That is, the oval is created by the collection of ($E_X$, $E_Y$) component values of the electric field as the electric field oscillates in time. FIG. 4B illustrates the Jones Vector for each wavelength of polarized light emitted by the tunable laser 12. FIG. 4C on the left side illustrates an example of output states of the optical signal emitted by the tunable laser 12 for multiple wavelengths that are identified as dots on the graph. FIG. 4C on the right side illustrates a Stokes vector representation of the output states illustrated on the graph on the left side. Each dot is a representation of the Poincare sphere of the state of polarization of each wavelength in the sweep of wavelengths. The Stokes vector representation uses a three-dimensional graph to illustrate each of the output states that can be illustrated by superimposed ovals such as in FIG. 4B. While different Jones vectors or ovals in FIG. 4B can be difficult to discern, the Stokes vectors in FIG. 4C are more readily discernable. The two large dots are the state of polarization of consecutive wavelengths in the sweep showing how different their Stokes vectors are and, thus, illustrating the effective randomness of polarization for consecutive wavelengths in the sweep.

Figure 5:
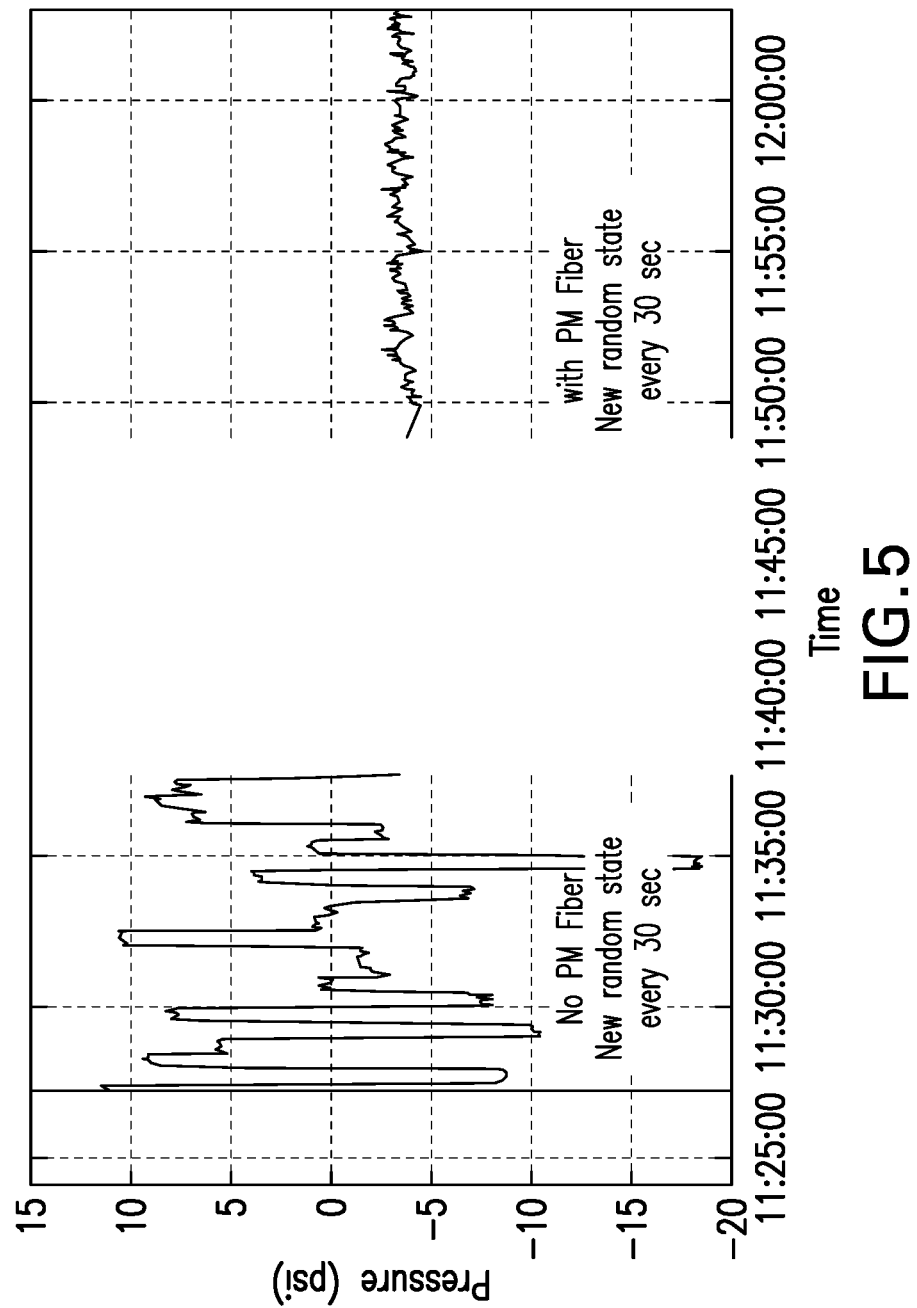
FIG. 5 depicts aspects of an optical signal received from the fiber optic sensor with and without the pseudo-random depolarizer.

FIG. 5 depicts aspects of an optical signal received from the fiber optic sensor with and without the passive pseudo-random depolarizer 15. The left side of FIG. 5 illustrates an example of pressure readings of an optical pressure gauge subjected to a constant pressure. The readings were obtained by the optical interrogator 10 without using the random depolarizer 15 in which the polarization of emitted polarized light was changed every 30 seconds. As can be seen, there is a wide range of pressure readings due to the birefringence of the single mode optical fiber 7. The right side of FIG. 5 illustrates an example of pressure readings of the same optical pressure gauge subjected to a constant pressure. The readings in this case were obtained by the optical interrogator 10 using the random depolarizer 15 in which the polarization of emitted polarized light was changed every 30 seconds. As can be seen, the range of pressure readings in significantly narrower than the range of readings without the random depolarizer 15 due to averaging out the effects of birefringence in the single mode optical fiber 7 as the wavelength of light is swept.

Figure 6:
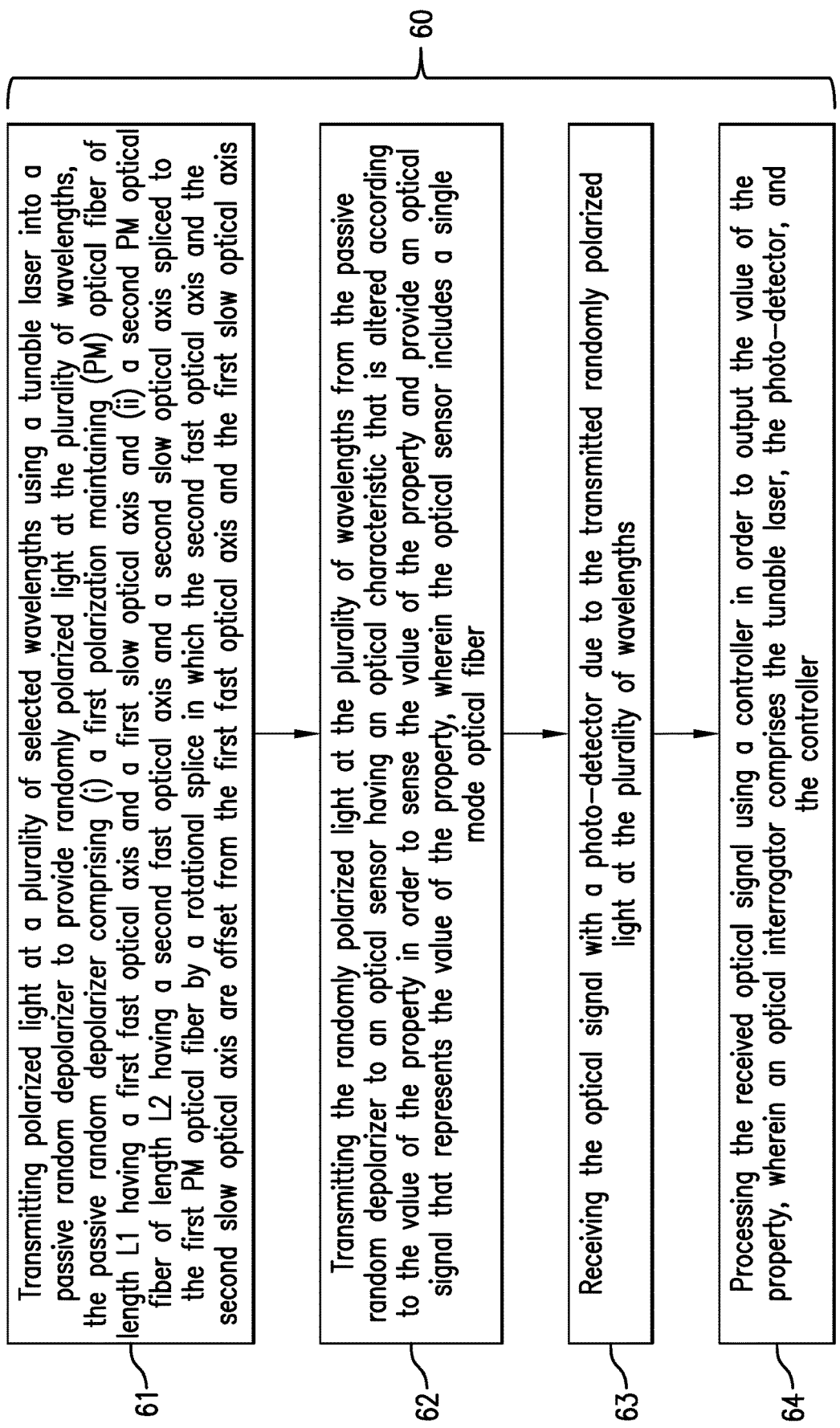
FIG. 6 is a flow chart for a method for sensing a parameter in a borehole penetrating a subsurface material.

FIG. 6 is a flow chart for a method 60 for sensing a parameter in a borehole penetrating a subsurface material. Block 61 calls for transmitting polarized light at a plurality of selected wavelengths using a tunable laser into a passive random depolarizer to provide randomly polarized light at the plurality of wavelengths, the passive random depolarizer comprising (i) a first polarization maintaining (PM) optical fiber of length L1 having a first fast optical axis and a first slow optical axis and (ii) a second PM optical fiber of length L2 having a second fast optical axis and a second slow optical axis spliced to the first PM optical fiber by a rotational splice in which the second fast optical axis and the second slow optical axis are offset from the first fast optical axis and the first slow optical axis.

Block 62 calls for transmitting the randomly polarized light at the plurality of wavelengths from the passive random depolarizer to an optical sensor having an optical characteristic that is altered according to the value of the property in order to sense the value of the property and provide an optical signal that represents the value of the property, wherein the optical sensor includes a single mode optical fiber.

Block 63 calls for receiving the optical signal with a photo-detector due to the transmitted randomly polarized light at the plurality of wavelengths. The photo-detector may include optical components necessary to characterize or interpret the received optical signal such as an interferometer or reference signal source.

Block 64 calls for processing the received optical signal using a controller in order to output the value of the property, wherein an optical interrogator comprises the tunable laser, the photo-detector, and the controller.

The method 60 may also include recording the property and/or presenting the property to a user using a display or printer.

Set forth below are some embodiments of the foregoing disclosure:

Embodiment 1: An apparatus for sensing a value of a property, the apparatus comprising: an optical sensor comprising a single mode optical fiber and having an optical characteristic that is altered according to the value of the property in order to sense the value of the property and provide an optical signal that represents the value of the property, an optical interrogator comprising a tunable laser configured to transmit polarized light at selected wavelengths to the optical sensor, a photo-detector configured to receive the optical signal due to the transmitted light, and a controller configured to process the optical signal in order to output the value of the property, and a passive random depolarizer disposed between the tunable laser and the single mode optical fiber and comprising (i) a first polarization maintaining (PM) optical fiber of length L1 having a first fast optical axis and a first slow optical axis and (ii) a second PM optical fiber of length L2 having a second fast optical axis and a second slow optical axis spliced to the first PM optical fiber by a first rotational splice in which the second fast optical axis and the second slow optical axis are offset from the first fast optical axis and the first slow optical axis, the second PM optical fiber being in optical communication with the single mode optical fiber.

Embodiment 2: The apparatus according to any previous embodiment, wherein the optical characteristic is natural scattering of light in the single mode optical fiber.

Embodiment 3: The apparatus according to any previous embodiment, wherein the offset is 45°.

Embodiment 4: The apparatus according to any previous embodiment, wherein L2 is greater than L1.

Embodiment 5: The apparatus according to any previous embodiment, further comprising a third PM optical fiber of length L3 disposed between the second PM optical fiber and the single mode optical fiber and having a third fast optical axis and a third slow optical axis, the third PM optical fiber being spliced to the second PM optical fiber by a second rotational splice in which the third fast optical axis and the third slow optical axis are offset from the second fast optical axis and the second slow optical axis, the third PM optical fiber being in optical communication with the single mode optical fiber.

Embodiment 6: The apparatus according to any previous embodiment, wherein L2 is greater than L1 and greater than L3.

Embodiment 7: The apparatus according to any previous embodiment, wherein L2 is greater than or equal to two meters.

Embodiment 8: The apparatus according to any previous embodiment, wherein the tunable laser is configured change the wavelength by a continuous sweep in a range of wavelengths and/or change the wavelength by step-wise changes in a range of wavelengths.

Embodiment 9: The apparatus according to any previous embodiment, wherein the optical sensor is disposed in a borehole penetrating a subsurface material.

Embodiment 10: The apparatus according to any previous embodiment, wherein the optical sensor is configured to sense at least one of pressure, temperature, and strain.

Embodiment 11: The apparatus according to any previous embodiment, wherein the passive random depolarizer is disposed in an enclosure housing the optical interrogator.

Embodiment 12: A method for sensing a value of a property, the method comprising: transmitting polarized light at a plurality of selected wavelengths using a tunable laser into a passive random depolarizer to provide randomly polarized light at the plurality of wavelengths, the passive random depolarizer comprising (i) a first polarization maintaining (PM) optical fiber of length L1 having a first fast optical axis and a first slow optical axis and (ii) a second PM optical fiber of length L2 having a second fast optical axis and a second slow optical axis spliced to the first PM optical fiber by a rotational splice in which the second fast optical axis and the second slow optical axis are offset from the first fast optical axis and the first slow optical axis, transmitting the randomly polarized light at the plurality of wavelengths from the passive random depolarizer to an optical sensor having an optical characteristic that is altered according to the value of the property in order to sense the value of the property and provide an optical signal that represents the value of the property, wherein the optical sensor comprises a single mode optical fiber, receiving the optical signal with a photo-detector due to the transmitted randomly polarized light at the plurality of wavelengths, and processing the optical signal using a controller in order to output the value of the property wherein an optical interrogator comprises the tunable laser, the photo-detector, and the controller.

Embodiment 13: The method according to any previous embodiment, further comprising disposing the optical sensor in a borehole penetrating a subsurface material.

In support of the teachings herein, various analysis components may be used, including a digital and/or an analog system. For example, the optical interrogator 10 and/or the computer processing system 11 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, magnet, electromagnet, sensor, electrode, transmitter, receiver, transceiver, antenna, controller, optical unit or components, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first," "second" and the like are used to differentiate elements and are not intended to denote a particular order.

The flow diagram depicted herein is just an example. There may be many variations to this diagram or the steps (or operations) described therein without departing from the scope of the invention. For example, operations may be performed in another order or other operations may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for sensing a value of a property, the apparatus comprising:
 an optical sensor comprising a single mode optical fiber and having an optical characteristic that is altered according to the value of the property in order to sense the value of the property and provide an optical signal that represents the value of the property;
 an optical interrogator comprising a tunable laser configured to transmit polarized light at selected wavelengths to the optical sensor, a photo-detector configured to receive the optical signal due to the transmitted light, and a controller configured to process the optical signal in order to output the value of the property; and a passive random depolarizer disposed between the tunable laser and the single mode optical fiber and comprising (i) a first polarization maintaining (PM) optical fiber of length L1 having a first fast optical axis and a first slow optical axis and (ii) a second PM optical fiber of length L2 having a second fast optical axis and a second slow optical axis spliced to the first PM optical fiber by a first rotational splice in which the second fast optical axis and the second slow optical axis are offset from the first fast optical axis and the first slow optical axis, the second PM optical fiber being in optical communication with the single mode optical fiber.

2. The apparatus according to claim 1, wherein the optical characteristic is natural scattering of light in the single mode optical fiber.

3. The apparatus according to claim 1, wherein the offset is 45°.

4. The apparatus according to claim 1, wherein L2 is greater than L1.

5. The apparatus according to claim 1, further comprising a third PM optical fiber of length L3 disposed between the second PM optical fiber and the single mode optical fiber and having a third fast optical axis and a third slow optical axis, the third PM optical fiber being spliced to the second PM optical fiber by a second rotational splice in which the third fast optical axis and the third slow optical axis are offset from the second fast optical axis and the second slow optical axis, the third PM optical fiber being in optical communication with the single mode optical fiber.

6. The apparatus according to claim 5, wherein L2 is greater than L1 and greater than L3.

7. The apparatus according to claim 5, wherein L2 is greater than or equal to two meters.

8. The apparatus according to claim 1, wherein the tunable laser is configured change the wavelength by a continuous sweep in a range of wavelengths and/or change the wavelength by step-wise changes in a range of wavelengths.

9. The apparatus according claim 1, wherein the optical sensor is disposed in a borehole penetrating a subsurface material.

10. The apparatus according to claim 9, wherein the optical sensor is configured to sense at least one of pressure, temperature, and strain.

11. The apparatus according to claim 1, wherein the passive random depolarizer is disposed in an enclosure housing the optical interrogator.

12. A method for sensing a value of a property, the method comprising:

transmitting polarized light at a plurality of selected wavelengths using a tunable laser into a passive random depolarizer to provide randomly polarized light at the plurality of wavelengths, the passive random depolarizer comprising (i) a first polarization maintaining (PM) optical fiber of length L1 having a first fast optical axis and a first slow optical axis and (ii) a second PM optical fiber of length L2 having a second fast optical axis and a second slow optical axis spliced to the first PM optical fiber by a rotational splice in which the second fast optical axis and the second slow optical axis are offset from the first fast optical axis and the first slow optical axis;

transmitting the randomly polarized light at the plurality of wavelengths from the passive random depolarizer to an optical sensor having an optical characteristic that is altered according to the value of the property in order to sense the value of the property and provide an optical signal that represents the value of the property, wherein the optical sensor comprises a single mode optical fiber;

receiving the optical signal with a photo-detector due to the transmitted randomly polarized light at the plurality of wavelengths; and processing the optical signal using a controller in order to output the value of the property;

wherein an optical interrogator comprises the tunable laser, the photo-detector, and the controller.

13. The method according to claim 12, further comprising disposing the optical sensor in a borehole penetrating a subsurface material.

\* \* \* \* \*